United States Patent [19]

Koyanagi et al.

[11] 3,945,958

[45] Mar. 23, 1976

[54] METHOD FOR SUSPENSION-POLYMERIZING VINYL CHLORIDE

[75] Inventors: Shunichi Koyanagi, Yokohama; Hajime Kitamura, Tokyo; Toshihide Shimizu, Ibaragi, all of Japan

[73] Assignee: Shinetsu Chemical Company, Tokyo, Japan

[22] Filed: May 31, 1974

[21] Appl. No.: 475,052

Related U.S. Application Data

[63] Continuation of Ser. No. 258,446, May 31, 1972, abandoned.

[52] U.S. Cl...... 260/17 A; 260/23 XA; 260/31.2 R; 260/78.5 R; 260/85.5 XA; 260/86.3; 260/87.1; 260/87.5 C; 260/87.5 R; 260/92.8 W
[51] Int. Cl.² ........................................... C08F 2/20
[58] Field of Search.......... 260/85.5 XA, 86.3, 87.1, 260/87.5 R, 87.5 C, 92.8 W, 17 A; 450/695

[56] References Cited
UNITED STATES PATENTS

| | | |
|---|---|---|
| 3,375,238 | 3/1968 | Bauer et al. ........................ 260/92.8 |
| 3,592,800 | 7/1971 | Oschmann et al. ................. 260/85.5 |
| 3,701,742 | 10/1972 | Richardson et al. ............... 260/17 R |

*Primary Examiner*—Stanford M. Levin
*Attorney, Agent, or Firm*—Jordan B. Bierman; Linda Bierman; Kenneth J. Stempler

[57] ABSTRACT

When vinyl chloride or a mixture of monomers containing vinyl chloride as its main component is subjected to suspension-polymerization, in the presence of a polymerization initiator, employing as a suspending agent an aqueous medium consisting of two kinds of water-soluble cellulose ethers, the 2% aqueous solution of one of which has a viscosity of at most 100 cps at 20°C, and that of the other has a viscosity of at least 400 cps at 20°C, the product obtained will be a porous polymer superior not only in uniformity of particle size, and absorptivity of plasticizers and liquid heat-stabilizers but also in processability.

6 Claims, No Drawings

METHOD FOR SUSPENSION-POLYMERIZING VINYL CHLORIDE

This application is a continuation of U.S. application Ser. No. 258,446, now abandoned, filed May 31, 1972 and which claims priority of Japanese application No. 70701/71, filed Sept. 11, 1971.

This invention relates to an improved method for suspension-polymerizing vinyl chloride or a mixture of monomers containing vinyl chloride as its main component.

It is well known that when polyvinyl chloride is to be prepared, the material monomer (vinyl chloride) is suspension-polymerized in an aqueous medium containing (i) a suspending agent consisting of one or more kinds of water-soluble polymer substances such as polyvinyl alcohol, water-soluble cellulose ether, vinyl acetate-maleic anhydride copolymer or partially saponified polyalkyl acrylate or gelatine, and (ii) a polymerization initiator. Further, the polyvinyl chloride thus prepared is porous and corpuscular and gives molded products superior not only in chemical properties such as chemical resistance but also in mechanical properties, so that a large quantity of such polyvinyl chloride is consumed as a material resin for making various molded products.

In choosing the method for suspension-polymerizing vinyl chloride, the greatest importance is attached to obtaining polyvinyl chloride which can be molded (extrusion or injection molding) with ease and which gives molded products of fine quality. Therefore, various studies have been conducted for the purpose of obtaining polyvinyl chloride which is uniform in particle distribution and superior in absorptivity of plasticizers (with regard to the amount of plasticizers absorbed and to the absorbing velocity), and in gelling velocity when molded. But those which have been reported upon so far are not very useful in that some are characterized by the use of an extremely specific suspending agent or additives, and with others, the selection and the combination of the suspending agents are very complicated. None, therefore, have met the requirements for an improvement of the properties as discussed.

An object of this invention is to provide a method for suspension-polymerizing vinly chloride or a mixture of monomers containing vinyl chloride as its main component by employing a specified suspending agent, whereby a superior polyvinyl chloride or a copolymer containing vinyl chloride as its main component is prepared.

Another object of this invention is to provide a method for preparing porous polyvinyl chloride or a copolymer containing vinyl chloride as its main component, which is superior in uniformity of particle size, in absorptivity of plasticizers, and in processability.

Still another object of this invention is to provide a method for preparing porous polymer which is functional, even if the polymerization temperature is higher than the softening temperature of the product to be prepared. The product is thereby superior in uniformity of particle size, in absorptivity of plasticizers and liquid heat-stabilizers, as well as in processability.

The present invention is characterized by employing, as a suspending agent, two kinds of water-soluble cellulose ether, with a 2% aqueous solution of one of them having a viscosity of no more than 100 cps at 20°C, and the other having a viscosity of at least 400 cps at 20°C, in an aqueous medium containing a polymerization initiator and a suspending agent and vinyl chloride or a mixture of monomers containing vinyl chloride as its main component.

To give a more detailed description of the method of the invention, when suspension-polymerizing vinyl chloride, if, as a suspending agent, only a water-soluble cellulose ether of a low polymerization degree is employed, it will disperse the monomer into the water very effectively, but will not be able to keep the monomer particles in a dispersed state, so that the polymer particles formed in the early stage of the polymerization are apt to be locally agglomerated, until at last various particle sizes ranging, for example, from $1,000\mu$ to $10\mu$ are formed, resulting in irregularity in polymer particle distribution. On the other hand, if, as a suspending agent, only a cellulose ether of a high polymerization degree is employed, the monomer particles will be kept stable in the dispersed state, but such a suspending agent will not be able to disperse the monomer uniformly into the water in the reactor. Therefore, the polymer prepared is apt to be in large glassy, globe-shaped grains, of the sizes of for example from $500\mu$ to $1,000\mu$, instead of being of porous substance. Such a polymer is extremely inferior in absorptivity of plasticizers and in gelling property at the time of molding. Thus it is clear that no polymer of superior quality can be obtained in either case.

Taking these technical problems into consideration, various studies were conducted and a conclusion has been arrived at that in a suspension-polymerizing vinyl chloride or a mixture of monomers containing vinyl chloride as its main component, if two kinds of cellulose ether, one being of a low polymerization degree, a 2% aqueous solution of which has a viscosity of no more than 100 cps at 20°C, and the other being of a comparatively high polymerization degree, a 2% aqueous solution of which has a viscosity of at least 400 cps, are employed, the following remarkable effects (i) and (ii) result:

i. Unfavorable phenomenon such as the agglomeration of the polymer prepared in the early stage of polymerization or the formation of glassy globular polymer, will be prevented. Additionally, the synergistic action of the two kinds of cellulose ethers make it possible to industrially produce in a good yield a porous polymer, uniform in particle size and superior in absorptivity of plasticizers.

ii. Even when the copolymerization is higher than the softening termperature of the polymer to be prepared, as in the suspension copolymerization of vinyl chloride with vinyl acetate or propylene, the fusion or agglomeration, which is apt to take place in the course of polymerization, of the copolymer prepared will be successfully prevented, and the product obtained will prove to be a porous polymer superior in particle-size uniformity in absorptivity of plasticizers and heat stabilizers, as well as in processability. Such findings of ours have led us to the present invention.

The two kinds of cellulose ether, one of a low polymerization degree, and the other of a high polymerization degree, employed in practicing the present invention, are exemplified by water-soluble cellulose ether such as methylcellulose, ethylcellulose, hydroxyethyl cellulose, hydroxypropyl cellulose, hydroxyethyl methylcellulose and hydroxypropyl methylcellulose.

The ratio of the amount by weight of the cellulose ether of a low polymerization degree, having a viscosity of no more than 100 cps to the cellulose ether of a high polymerization degree, having a viscosity of at least 400 cps had better be from 1:4 to 4:1 in order to have them exhibit the synergistic effect to the best advantage.

If the amounts employed are too small, neither the uniform distribution of the monomer particles nor the stabilization of the dispersed particles can be expected to take place, and if they are too large, the particles of the polymer prepared will become too fine or the polymer will be inferior in porosity, so that the total amount should be from 0.01 to 0.5% by weight based on the weight of the monomer charged.

The present invention is applicable not only to the suspension-polymerization of vinyl chloride alone but also to that of a mixture of monomers containing vinyl chloride as its main component. The comonomers copolymerizable with vinyl chloride are exemplified by vinyl esters such as vinyl acetate, vinyl ethers such as stearyl vinyl ether, cetyl vinyl ether, and lauryl vinyl ether, α-monoolefins such as ethylene, propylene and butylene, acrylic and methacrylic alkyl ester, maleic anhydride, maleic alky ester, fumaric alkyl ester, vinylidene halide, vinyl halides excepting vinyl chloride, aromatic vinyl compounds such as styrene and α- methylstyrene, acrylonitrile, and methacrylonitrile.

The polymerizing catalyst for practicing the method of the present invention is exemplified by organic peroxides such as benzoylperoxide, lauroylperoxide, diisopropylperoxydicarbonate, dicyclohexylperoxydicarbonate, tertiary butylperoxypivalate, acetyl cyclohexylsulfonylperoxide, and azo compounds such as azobisisobutyranitrile and azobis-2,4-dimethylvaleronitrile, used either singly or in combination.

Besides employing, as a suspending agent, the above-given two kinds of water-soluble cellulose ether, the present invention may be practiced in accordance with the known suspensionpolymerization methods, with regard to charging the monomer(s) (successive charging), stirring the polymerization system, and the length of the polymerization time. Any known dispersing agents pH controllers (alkaline substances), and polymerization controllers such as organic solvents, may be used, in small quantities together with the two kinds of cellulose ether.

In the following examples, all the parts are parts by weight. The viscosity of the cellulose ether is that of a 2% solution of it at 20°C and the physical properties of the polymers were measured by the methods described below.

Absorption by the polymer of a plastizer:

To a prescribed quantity of a polymer was added double the quantity of di-2-ethylhexyl phthalate (DOP), and after being let to stand at room temperature for 1 hour, the mixture was put in a tube equipped at the bottom with a thin tube packed with glass fiber, and employing a centrifugal separator for laboratory use, it was subjected to centrifugation at a velocity of 3,000 r.p.m. for an hour. The amount (%) of DOP absorbed by the polymer as measured at the end of the centrifugation, was employed to show the absorptivity by the polymer of the plasticizer.

Absorption velocity by the polymer of a plasticizer:

A mixer having an inner capacity of 500 cc and equipped with a sigma-type stirrer was set to a brabender plastograph, and after the jacket of the mixer was heated to 80°C, 300 g of the polymer was put in it and the mixture was stirred at 30 r.p.m. for 2 minutes, when 50 g of DOP were added to it. The stirring was continued as ever, and the time elapsed from the addition of DOP till the torque of stirring gave the maximum value was employed to show the velocity at which the plasticizer was absorbed by the polymer.

Gelling velocity:

A mixer having an inner capacity of 50 cc and equipped with a roller-type stirrer was set to a plastograph, and after the jacket of the mixer was heated to 185°C, 65 g of a composition consisting of:

| | |
|---|---|
| Polymer | 100 parts |
| Tribasic lead sulfate | 2.0 parts |
| Lead stearate | 1.5 parts |
| Barium stearate | 0.7 part |
| Titanium oxide | 0.5 part | were put in it, and the composition was stirred at 30 r.p.m. The time elapsed from the beginning of the stirring until the torque of stirring gave the maximum value was employed to show the gelling velocity of the polymer.

Dry flow:

100 parts of the polymer, 3 parts of dibutylin dilaurate and 0.5 part of barium stearate were stirred with a high speed mixer, while they were heated from room temperature up to 140°C, and then the mixture was cooled down once more to room temperature and let to flow from the hopper through an 8 mm φ outlet. The time required for a prescribed amount of the mixture to flow out was employed to denote the dry flow of the polymer.

The following examples are illustrative only and not meant to be limiting in any way:

EXAMPLE 1

In a 1,000 liter stainless steel reactor were put:

| | |
|---|---|
| Methylcellulose | 0.15 part |
| Water | 200 parts |
| α,α'azobisdimethylvaleronitrile | 0.025 part |
| Vinyl chloride | 100 parts |

As a suspending agent, two kinds of methylcelluloses were used, MC-A, having a viscosity of 15 cps, and containing 28.5% by weight of methoxy radical, and MC-B, having a viscosity of 1,000 cps and containing 28% by weight of methoxy radical, in the ratio set forth in Table 1. The polymerization was carried out at 57°C for 9 hours, whereby a polymer having the physical properties set forth in Table 1 was obtained.

It was determined from the results that with the method of the invention a polymer which is extremely superior in particle size distribution, plasticizer absorptivity and gelling property when molded is obtained as compared with those obtained in the controls.

When a similar experiment was conducted, employing as a suspending agent a partially saponified polyvinyl acetate (saponification value: 80 mole %, and average polymerization degree: 1,750) instead of the two kinds of methylcelluloses (MC-A and MC-B), the polymer obtained (quantity of the plasticizer absorbed (%): 18.5%, plasticizer absorption velocity: 20 minutes, and gelling velocity: 20 minutes) proved to be considerably inferior to the one obtained by the method of the invention.

Table 1

| Exp. No. | | Control | | Present invention | | |
|---|---|---|---|---|---|---|
| | | 1 | 2 | 3 | 4 | 5 |
| MC-A/MC-B | | 100/0 | 0/100 | 75/25 | 50/50 | 25/75 |
| Particle size distribution (%) | 60 mesh thru | 56.5 | 42.3 | 100 | 100 | 100 |
| | 80 mesh thru | 53.6 | 30.0 | 89.1 | 80.0 | 79.9 |
| | 100 mesh thru | 50.1 | 21.5 | 60.5 | 45.6 | 45.9 |
| | 115 mesh thru | 48.6 | 10.5 | 29.9 | 20.1 | 21.3 |
| | 150 mesh thru | 32.2 | 6.3 | 12.3 | 9.3 | 8.0 |
| | 200 mesh thru | 28.5 | 0.1 | 1.2 | 0.4 | 0.2 |
| Quantity of plasticizer absorbed (%) | | 18.5 | 12.3 | 31.9 | 30.0 | 29.8 |
| Plasticizer absorption velocity (min) | | 20 | 21 | 10 | 10 | 12 |
| Gelling velocity (min) | | 20 | 21 | 16 | 15 | 17 |

EXAMPLE 2.

An experiment similar to the one described in Example 1 (Experiments 1–5) was conducted in which, instead of the two kinds of methyl cellulose, MC-A and MC-B, HPMC-A (hydroxypropyl methylcellulose having a viscosity of 50 cps and containing 9.8% by weight of hydroxypropyl radical and methoxy radical content: 29% by weight) and HPMC-B (hydroxypropylmethyl cellulose, having a viscosity of 1,500 cps and containing 7% by weight of hydroxypropyl radical) were employed. The polymer obtained proved to have the physical properties given in Table 2.

In Exp. 9, HPMC-B was replaced by hydroxypropyl methylcellulose (viscosity: 200 cps, hydroxypropyl radical content: 7% by weight and methoxy radical content: 30% by weight). The polymer obtained was extremely varied in particle size (60 mesh thru: 43.2%, and 200 mesh thru: 11.5%).

Table 2

| Exp. No. | | Control | | Present invention | | |
|---|---|---|---|---|---|---|
| | | 6 | 7 | 8 | 9 | 10 |
| HPMC-A/HPMC-B | | 100/0 | 0/100 | 75/25 | 50/50 | 25/75 |
| Particle size distribution (%) | 60 mesh thru | 66.2 | 21.3 | 100 | 100 | 100 |
| | 80 mesh thru | 60.3 | 15.1 | 80.1 | 79.5 | 79.0 |
| | 100 mesh thru | 52.5 | 3.8 | 69.7 | 48.6 | 40.3 |
| | 115 mesh thru | 50.3 | 1.8 | 38.5 | 21.1 | 20.0 |
| | 150 mesh thru | 41.1 | 0.2 | 11.8 | 9.7 | 8.8 |
| | 200 mesh thru | 39.0 | 0.1 | 1.5 | 0.7 | 0.2 |
| Quantity of plasticizer absorbed (%) | | 20.3 | 10.5 | 30.5 | 30.0 | 29.3 |
| Plasticizer absorption velocity (min) | | 19 | 20 or more | 9 | 10 | 10 |
| Gelling velocity (min) | | 20 | 25 or more | 14 | 16 | 16 |

EXAMPLE 3

An experiment similar to the one described in Example 2 (Exp 8) was conducted in which the only difference was that HPMC-B was replaced by HEMC-B (hydroxyethyl methylcellulose, having a viscosity of 1,000 cps and containing 5% of hydroxethyl radical, 29% by weight of methoxy radical), and the polymer obtained proved to have the physical properties given in Table 3 (Exp. 12).

Table 3

| Exp. No. | | Control | Present invention |
|---|---|---|---|
| | | 11 | 12 |
| HPMC-A/HEMC-B | | 0/100 | 75/25 |
| Particle size distribution (%) | 60 mesh thru | 31.3 | 100 |
| | 80 mesh thru | 20.5 | 83.5 |
| | 100 mesh thru | 15.6 | 55.0 |
| | 115 mesh thru | 4.5 | 31.2 |
| | 150 mesh thru | 2.1 | 15.6 |
| | 200 mesh thru | 0.8 | 2.0 |
| Quantity of plasticizer absorbed (%) | | 17.0 | 34.9 |
| Plasticizer absorption velocity (min) | | 20 or more | 7 |
| Gelling velocity (min) | | 24 | 17 |

EXAMPLE 4.

In a reactor were put:

| | |
|---|---|
| Methylcellulose | 0.5 part |
| Water | 200 parts |
| Diisopropylperoxydicarbonate | 0.02 part |
| Vinyl chloride | 85 parts |
| Vinyl acetate | 15 parts |
| Trichloroethylene | 3 parts | and with an addition of MC-A (methylcellulose, like the one employed in Example 1) and MC-B' (methylcellulose having a viscosity of 4,000 cps and containing 29% by weight of methoxy radical) in the ratio given in Table 4. The mixture was polymerized at 57°C for 15 hours, obtaining the copolymer which had the physical properties given in Table 4.

The compositions obtained in Exp. 13 and 14 were inferior in dry flow, the former very sticky and the latter utterly unable to flow out from the hopper, proving that the copolymers prepared were extremely inferior in the absorption of liquid stabilizers such as dibutyltin dilaurate.

It was observed that the compositions obtained in Exp. 15, 16 and 17 had a softening point of 51°C (when measured by means of the Clash-Berg softening point measuring method), proving that by the method of the invention, hardly any agglomeration of the polymer particles will take place, even if the polymerization temperature should be above the softening point of the polymer to be prepared, so that the polymer obtained will be superior in uniformity of particle size and in absorption of plasticizers.

|  |  | Control |  | Present Invention |  |  |
|---|---|---|---|---|---|---|
| Exp. No. |  | 13 | 14 | 15 | 16 | 17 |
| MC-A/ MC-B' |  | 100/ 0 | 0/ 100 | 75/ 25 | 50/ 50 | 25/ 75 |
| Particle size distribution (%) | 60 mesh thru | 88.0 | 65.0 | 100 | 100 | 100 |
|  | 80 mesh thru | 72.2 | 42.1 | 90.6 | 89.2 | 80.9 |
|  | 100 mesh thru | 66.1 | 21.2 | 66.2 | 62.8 | 50.1 |
|  | 115 mesh thru | 60.1 | 12.8 | 50.8 | 51.8 | 25.8 |
|  | 150 mesh thru | 58.1 | 8.4 | 22.1 | 18.4 | 14.1 |
|  | 200 mesh thru | 56.6 | 0.2 | 4.2 | 2.2 | 1.0 |
| Quantity of plasticizer absorbed (%) |  | 10.1 | 5.6 | 22.0 | 21.5 | 19.3 |
| Dry flow (sec) |  | No flow | 28 | 12 | 10 | 9 |

EXAMPLE 5

An experiment similar to the one described in Example 4 (Exp. 16) was conducted in which the only difference was that MC-B' was replaced by HPC-B (hydroxypropyl cellulose having a viscosity of 8,000 cps and containing 45% by weight of hydroxypropyl radical). The polymer obtained proved to have the physical properties given in Table 5 (Exp. 19).

|  |  | Control | Present invention |
|---|---|---|---|
| Exp. No. |  | 18 | 19 |
| MC-A/ HPC-B |  | 0/ 100 | 50/ 50 |
| Particle | 60 mesh thru | 51.2 | 100 |

|  |  | Control | Present invention |
|---|---|---|---|
| Exp. No. |  | 18 | 19 |
| MC-A/ HPC-B |  | 0/ 100 | 50/ 50 |
| size distribution (%) | 100 mesh thru | 43.5 | 90.3 |
|  | 200 mesh thru | 38.0 | 3.8 |
| Quantity of plasticizer absorbed (%) |  | 4.9 | 18.6 |
| Dry flow (sec) |  | 30 | 13 |

EXAMPLE 6.

In a reactor were put and subjected to polymerization at 60° for 20 hours:

| Hydroxypropyl methylcellulose | 0.4 part |
|---|---|
| Water | 300 parts |
| Lauroyl peroxide | 0.1 part |
| Vinyl chloride | 70 parts |
| Vinyl acetate | 30 parts | where the hydroxypropyl methylcellulose (HPMC) as shown in Table 6 was two kinds of HPMC's (1:1, ratio by weight) differing in viscosity but invariably containing 8% by weight of hydroxypropyl radical and 29% by weight of methoxy radical. When the copolymer obtained was filtered off and dried, the product proved to have the physical properties given in Table 6. The softening temperature of the copolymer was found to be about 47°C in every case.

Table 6

|  | Control |  |  |  | Present invention |  |  |  |  | Control |
|---|---|---|---|---|---|---|---|---|---|---|
| Exp. No. | 20 | 21 | 22 | 23 | 24 | 25 | 26 | 27 | 28 | 29 |
| HPMC |  |  |  |  |  |  |  |  |  |  |
| CPS | 15 | 15 | 15 | 15 | 15 | 15 | 15 | 15 | 15 | 1500 |
| CPS | 50 | 100 | 400 | 800 | 1000 | 1500 | 4000 | 8000 | 15000 | 8000 |
| Mean polymerization degree | 600 | 620 | 600 | 660 | 600 | 610 | 600 | 600 | 600 | 600 |
| Chlorine content (%) | 40.80 | 40.00 | 41.00 | 40.50 | 40.72 | 40.88 | 40.20 | 40.25 | 40.66 | 40.99 |
| Gelling velocity (min) * | 2.3 | 2.5 | 2.5 | 2.4 | 2.3 | 2.0 | 2.0 | 2.2 | 2.5 | 8.2 |
| Dry flow (sec) | None | None | 40 | 38 | 18 | 8 | 5 | 13 | 13 | 32 |
| Particle 60 mesh | 69.2 | 72.8 | 100 | 100 | 100 | 100 | 100 | 100 | 100 | 21.3 |

Table 6-continued

|  |  | Control |  |  | Present invention |  |  |  |  | Control |
|---|---|---|---|---|---|---|---|---|---|---|
| cle | thru 80 mesh | 68.3 | 72.0 | 75.0 | 73.2 | 86.6 | 89.2 | 85.4 | 80.1 | 88.1 | 15.1 |
| size dis- tri- bu- tion (%) | thru 100 mesh | 61.5 | 70.8 | 71.2 | 66.1 | 80.1 | 80.1 | 71.5 | 69.7 | 62.3 | 3.8 |
|  | thru 115 mesh | 69.8 | 66.8 | 65.8 | 53.2 | 75.1 | 62.3 | 61.9 | 38.5 | 35.5 | 1.8 |
|  | thru 150 mesh | 60.9 | 59.2 | 39.8 | 40.0 | 41.8 | 34.6 | 21.8 | 11.8 | 10.5 | 0.2 |
|  | thru 200 mesh thru | 52.3 | 53.8 | 23.0 | 20.2 | 21.0 | 11.2 | 8.2 | 5.4 | 4.8 | 0.1 |

\* The temperature of the mixer jacket was kept at 130°C.

EXAMPLE 7

In a reactor were put and subjected to polymerization at 55°C for 30 hours:

| Cellulose ether | 0.2 part |
| Water | 300 parts |
| Isopropylperoxydicarbonate | 0.05 part |
| Vinyl chloride | 93 parts |
| Propylene | 7 parts |

As cellulose ether, two kinds of cellulose ethers of various viscosities (1:1, ratio by weight) selected from the group consisting of methyl cellulose (MC) containing 28% by weight of methoxy radical, hydroxypropyl cellulose (HPC) containing 45% by weight of hydroxypropyl radical, and hydroxypropyl methylcellulose (HPMC), containing 8% of hydroxypropyl radical and 29% by weight of methoxy radical were employed. When the copolymer obtained was filtered off and dried, the product proved to have the physical properties given in Table 7. The softening temperature of the copolymer was found to be about 53°C in every case.

EXAMPLE 8.

In a reactor were put and subjected to polymerization at 57°C for 15 hours:

| Methylcellulose | 0.5 | part |
| Water | 200 | parts |
| Diisopropyl peroxydicarbonate | 0.02 | part |
| Vinyl chloride | 85 | parts |
| Stearyl vinyl ether | 15 | parts |
| Trichloroethylene | 3 | parts |

As methyl cellulose, two kinds of methyl celluloses (MC-A and MC-B') like those employed in Example 4, [as given in Table 8] were used. The copolymer obtained proved to have the physical properties given in Table 8, and its softening temperature was found to be about 45°C in every case.

Table 8

|  |  | Control |  | Present invention |
|---|---|---|---|---|
| Exp. No. |  | 34 | 35 | 36 |
| MC-A/ |  | 100/ | 0/ | 50/ |
| MC-B' |  | 0 | 100 | 50 |
| Particle | 60 mesh thru | 85.0 | 64.0 | 100 |

Table 7

|  |  | Control |  | Present invention |  |
|---|---|---|---|---|---|
| Exp. No. |  | 30 | 31 | 32 | 33 |
| Cellulose ether (CPS) |  | MC (100) HPC (100) | MC (4000) HPMC (4000) | MC (100) HPC (8000) | MC (100) HPMC (8000) |
| Polymerization degree |  | 700 | 700 | 710 | 700 |
| Chlorine content (%) |  | 53.30 | 53.33 | 53.28 | 53.28 |
| Gelling velocity (min) |  | 17 | 12 | 10 | 10 |
| Dry flow (sec) |  | None | 28 | 9 | 12 |
| Par- ti- cle size dis- tri- bu- tion (%) | 60 mesh thru | 83.3 | 10.1 | 100 | 100 |
|  | 80 mesh thru | 69.3 | 8.5 | 99.8 | 90.8 |
|  | 100 mesh thru | 60.8 | 2.1 | 90.3 | 72.5 |
|  | 115 mesh thru | 52.2 | 0.3 | 52.2 | 40.8 |
|  | 150 mesh thru | 41.1 | 0.1 | 21.0 | 18.5 |
|  | 200 mesh thru | 38.0 | 0.1 | 3.8 | 2.1 |

Table 8-continued

| | | Control | | Present invention |
|---|---|---|---|---|
| Exp. No. | | 34 | 35 | 36 |
| MC-A/ | | 100/ | 0/ | 50/ |
| MC-B' | | 0 | 100 | 50 |
| size | 80 mesh thru | 70.5 | 42.5 | 90.1 |
| distri- | 100 mesh thru | 64.0 | 20.8 | 65.2 |
| bution | 115 mesh thru | 54.6 | 13.1 | 53.1 |
| (%) | 150 mesh thru | 46.7 | 7.6 | 18.2 |
| | 200 mesh thru | 30.0 | 0.3 | 2.0 |
| Plasticizer absorption (%) | | 10.0 | 5.3 | 21.6 |
| Dry flow (sec) | | None | 29 | 9 |

What we claim is:

1. In a method for suspension-polymerizing, in an aqueous medium containing a polymerization initiator and a suspending agent, vinyl chloride or a mixture of monomers containing vinyl chloride as a main component, the improvement in which the suspending agent comprises a mixture of two water soluble cellulose ethers wherein the first water soluble cellulose ether has a viscosity of no more than 100 cps at 20°C and the second water soluble cellulose ether has a viscosity of at least 400 cps at 20°C, the viscosities being of a 2% aqueous solution, said ethers being present in the ratio of about 1:4 to 4:1 by weight, and in a total amount of 0.01 to 0.05% by weight based on the weight of monomer charged and said water soluble cellulose ethers being selected from the group consisting of methylcellulose, ethylcellulose, hydroxypropylcellulose, hydroxyethyl methylcellulose, and hydroxypropyl methylcellulose.

2. The method as recited in claim 1 wherein the mixture contains from 50 to 99 parts by weight of vinyl chloride and 50 to 1 part by weight of copolymerizable monomer.

3. The method as recited in claim 2 wherein the suspension polymerization is conducted at a temperature higher than the softening temperature of a copolymer prepared from the mixture.

4. The method as recited by claim 2 wherein the copolymerizable monomer is selected from the group consisting of vinyl esters, vinyl ethers, α-monooleofins, and aromatic vinyl compounds.

5. The method as recited in claim 2 wherein the copolymerizable monomer is selected from the group consisting of vinyl acetate, stearyl vinyl ether, cetyl vinyl ether, lauryl vinyl ether, ethylene, propylene, butylene, methyl acrylate, methyl methacrylate, vinylidene halide, vinyl halides except vinyl chloride, styrene, α-methylstyrene, acrylonitrile, and methacrylonitrile.

6. The method as recited in claim 1, wherein the polymerization initiator is selected from the group consisting of benzoylperoxide, lauroylperoxide, diisopropylperoxydicarbonate, dicylohexylperoxydicarbonate, tertiary butylperoxypivalate, acetylcyclohexysulfonyl peroxide, azobisisobutylbutyronitrile and azobis-2, 4-dimethylvaleronitrile.

* * * * *